(12) United States Patent
Ogimoto et al.

(10) Patent No.: US 6,593,014 B1
(45) Date of Patent: Jul. 15, 2003

(54) THERMOMAGNETIC RECORDING MEDIUM, THERMOMAGNETIC RECORDING AND REPRODUCING METHOD, AND THERMOMAGNETIC RECORDING AND REPRODUCING DEVICE

(75) Inventors: Yasushi Ogimoto, Noda (JP); Kenji Nakanishi, Chiba (JP); Masaki Hamamoto, Tenri (JP); Kunio Kojima, Nabari (JP); Hiroyuki Katayama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/580,812

(22) Filed: May 26, 2000

(30) Foreign Application Priority Data

May 26, 1999 (JP) ............................................ 11-146141

(51) Int. Cl.⁷ ............................. G11B 11/00; G11B 5/02
(52) U.S. Cl. .......................... 428/694 R; 428/694 ML; 428/632; 428/469; 428/697; 428/702; 369/13.38; 369/14; 369/15; 369/13.56; 360/59
(58) Field of Search .......................... 428/689, 694 R, 428/694 ML, 697, 701, 702, 632, 469, 694 RL; 369/13.01, 13.1, 13.38, 13.4, 14, 15, 13.56; 360/59

(56) References Cited

U.S. PATENT DOCUMENTS

| | | | | |
|---|---|---|---|---|
| 4,612,587 A | * | 9/1986 | Kaneko et al. ................. 360/59 |
| 4,757,492 A | * | 7/1988 | Fukushima et al. .......... 369/100 |
| 4,839,226 A | * | 6/1989 | Sawada et al. ............... 428/336 |
| 4,883,710 A | * | 11/1989 | Machida et al. ............. 428/336 |
| 5,068,050 A | * | 11/1991 | Insomata et al. ......... 252/62.51 |
| 5,175,714 A | * | 12/1992 | Kikitsu et al. ................. 360/59 |
| 5,241,165 A | * | 8/1993 | Drexler ........................ 235/488 |
| 5,684,763 A | * | 11/1997 | Kurita et al. ............. 369/13.02 |
| 5,695,863 A | * | 12/1997 | Bloemen et al. ......... 369/13.35 |
| 5,717,662 A | * | 2/1998 | Nishimura .................... 369/13 |
| 5,736,265 A | * | 4/1998 | Tanaka et al. ........ 438/694 ML |

FOREIGN PATENT DOCUMENTS

| | | |
|---|---|---|
| JP | 2-304750 | 12/1990 |
| JP | 3-209649 | 9/1991 |
| JP | 2617025 | 3/1997 |
| JP | 10-40580 | 2/1998 |

* cited by examiner

Primary Examiner—Deborah Jones
Assistant Examiner—Stephen Stein
(74) Attorney, Agent, or Firm—Edwards & Angell, LLP; David G. Conlin, Esq.; Richard J. Roos, Esq.

(57) ABSTRACT

A thermomagnetic recording medium includes a thermal change layer whose thermal conductivity is induced to change by a metal-to-insulator transition, is greater on a lower temperature side of a transition temperature and is smaller on a higher temperature side thereof. A thermomagnetic recording method includes setting a recording or reproducing temperature higher than the temperature of the recording medium at the circumference of a light spot and higher than a threshold temperature for change of the thermal conductivity of the thermal change layer. A thermomagnetic recording and reproducing device is provided with the above-mentioned thermomagnetic recording medium, an optical pickup and a magnetic head and conducts recording and reproduction by the above-mentioned thermomagnetic recording and reproducing device.

9 Claims, 18 Drawing Sheets

THERMOMAGNETIC RECORDING MEDIUM, THERMOMAGNETIC RECORDING AND REPRODUCING METHOD, AND THERMOMAGNETIC RECORDING AND REPRODUCING DEVICE

CROSS-REFERENCE TO RELATED APPLICATION

This application is related to Japanese Patent Application No. HEI 11-146141 filed on May 26, 1999, whose priority is claimed under 35 USC § 119, the disclosure of which is incorporated by reference in its entirety.

BACKGROUND OF THE INVENTION

1. Field of the Invention

The present invention relates to a thermomagnetic recording medium, a thermomagnetic recording and reproducing method and a thermomagnetic recording and reproducing device for recording information with use of heat and magnetism and reproducing optical or magnetic signals with use of heat.

2. Description of Related Art

Recently, remarkable development has been seen in technology for high-density optical memories as typified by DVDs (digital versatile disks) and magneto-optical disks, and a recording density over several Gbits/in$^2$ has already been realized. However, higher density is still desired for mass-storage devices for so-called home servers intended to store motion video pictures.

The recording density of such optical memories is basically determined by the diameter of a light spot formed by irradiation of laser light or other kind of light (more precisely, temperature distribution formed by the light spot). Therefore, now proceeding is the development of a purplish blue laser for providing a light source of a shorter wavelength and the increase of numerical aperture (NA) by use of a solid immersion lens (SIL), with the intention of reducing the light spot diameter (defined as a range within which light intensity does not fall below $1/e^2$).

In addition to such techniques of reducing the light spot diameter, the recording density of magneto-optical memories is being raised by a magnetic superresolution technique by skillful use of the temperature distribution formed by the light spot and temperature characteristics of a magnetic medium.

Besides magneto-optical memories, proposed are new high-density magnetic memories in which optical technology and magnetic technology are combined. For example, Japanese Patent Publication No. 2617025 discloses recording on and reproduction from a narrow track corresponding to the light spot diameter with use of a wide magnetic head without cross talk by "employing a ferrimagnetic substance having a compensation point at room temperature and applying a light beam at recording and reproducing for raising temperature" (the disclosed memory will be referred to as an optically assisted magnetic memory hereinafter).

To control the temperature distribution of media is considered to be an effective way of improving the recording density of memories such as the above-described magneto-optical memories and optically assisted memory which employ both heat and magnetism for recording and reproduction (referred to as thermomagnetic recording hereinafter).

For controlling the temperature distribution in such media, there are seen a lot of techniques of designing the thermal conductivity itself of layers of media with varying materials therefor, and proposed is the use of "a layer whose thermal conductivity changes with temperature (referred to as a thermal change layer)."

For example, Japanese Unexamined Patent Publication No. HEI 2(1990)-304750 discloses the provision for a magneto-optical medium of a reflection film "whose thermal conductivity drops at around a magnetic transition temperature" for preventing a decline in a carrier to noise (C/N) ratio due to thermal interference between adjacent bits and also discloses the use of magnetic phase transition (Néel temperature=170° C.) of a Cr film, which is an antiferromagnetic substance, for this reflection film which acts as a thermal change layer.

Also, for an example of a magneto-optical medium, Japanese Unexamined Patent Publication No. HEI 3(1991)-209649 discloses "the control of changes in temperature gradient in a region irradiated by laser light" by use of "a recording assist film comprised of a material whose thermal conductivity declines with rise of temperature" and also discloses the use of a TiN film, a ZrN film and a SnO$_2$ film as this recording assist film which acts as a thermal change layer.

Further, Japanese Unexamined Patent Publication No. HEI 10(1998)-40580 discloses an example of a phase change optical medium in which a thermal change layer "whose thermal conductivity changes with increase of light intensity" is used for "decreasing the size of recording marks while maintaining an operational power margin" with the intention of obtaining higher density and also discloses the use of a "low-melting metal" for this thermal change layer.

However, it has been found that the above-described conventional techniques have problems in the principles themselves of realizing the "change of the thermal conductivity" of the thermal change layers.

More particularly, in the conventional technique employing the "magnetic transition temperature" of the Cr film, since this technique is based on the principle that the specific heat changes only around the magnetic transition temperature, the thermal conductivity of the thermal change layer is large at temperatures sandwiching and near a changing temperature of the thermal change layer. Therefore, there arise problems in that at recording, the shape of bits deforms and at reproduction, the shape of an aperture in the magnetic superresolution deforms.

In the technique using the TiN film, ZrN film and SnO$_2$ film, the thermal conductivity changes smoothly and slightly. That is, it is difficult to obtain a sharp change in the temperature distribution in the light spot.

On the other hand, in the technique using the phase change from solid to liquid of the low-melting metal, the thermal conductivity changes sharply. However, this technique utilizes the change of the thermal conductivity caused by melting of the material, which may possibly involve a change in the thickness of the layer and diffusion of the material into other layers. This restricts repeated use of the medium and mars the reliability of the medium. Especially, since high reliability is a feature of magneto-optical memories and thermomagnetic recording media, significant marring of the reliability through repeated use is a serious problem because such marring destroys the feature of the medium itself.

SUMMARY OF THE INVENTION

An object of the present invention is to provide a thermomagnetic recording medium, a thermomagnetic recording and reproducing method and a thermomagnetic recording device which are capable of recording and reproducing at an improved density without reducing the light spot diameter, wherein the temperature distribution in the thermomagnetic recording medium is controlled to realize recording on and reproducing from a track narrower than the light spot, with use of a thermal change layer (1) providing a sharp change in temperature and (2) having a high reliability.

For achieving the above-mentioned object, the thermomagnetic recording medium of the present invention is characterized by comprising at least a recording/reproducing layer and a thermal change layer, wherein a thermal conductivity of the thermal change layer is induced to change by a metal-to-insulator transition as a phase transition between solid-to-solid phases.

For accomplishing the present invention, the inventors, taking notice of the fact that the change of the thermal conductivity is represented by the sum of the thermal conductivity of carriers (electrons or holes) and that of a lattice, utilize a kind of phase transition from one solid phase to another solid phase in the thermal change layer. According to the present invention, a sharp change in the thermal conductivity is obtained within a recording and reproduction temperature range, and a high-density recording is achieved by the thermomagnetic recording medium provided with the reliable thermal change layer, the thermomagnetic recording and reproducing method and the thermomagnetic recording and reproducing device.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
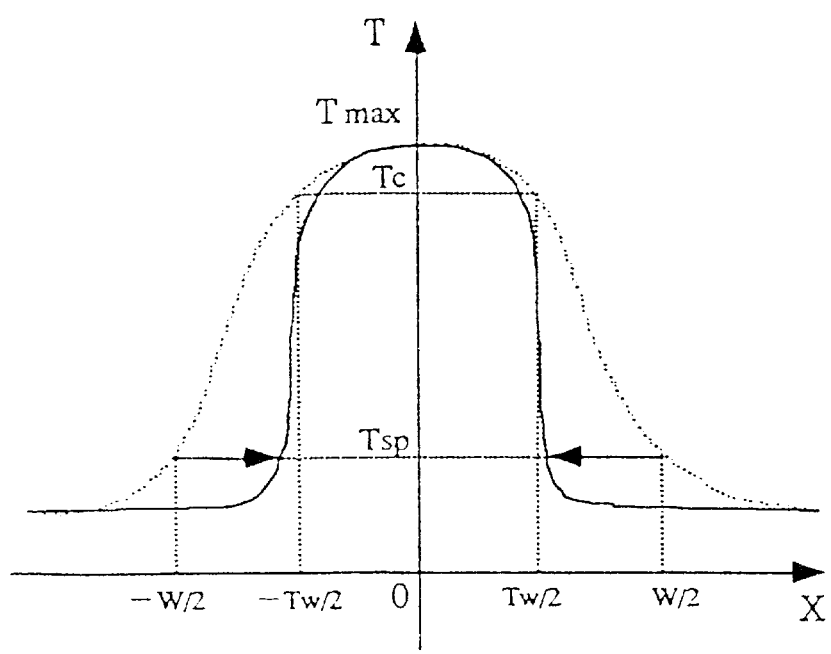
FIG. 1 is a chart showing a temperature distribution on a recording media obtained by a thermal change layer in accordance with the present invention.

The thermomagnetic recording medium of the present invention includes at least a recording/reproducing layer and a thermal change layer, and the thermal conductivity of the thermal change layer is induced to change by a metal-to-insulator transition. The thermal change layer is formed of a material which changes to have either a metallic thermal conductivity or a thermal conductivity of an insulator according to a change in temperature.

Further, in the above-described thermomagnetic recording medium, the change of the thermal conductivity of the thermal change layer may have a threshold value, and the thermal conductivity of the thermal change layer may rise on a lower temperature side of a transition temperature of the metal-to-insulator transition and may drop on a higher temperature side thereof.

Further, in the above-described thermomagnetic recording medium, the thermal change layer may be composed of laminated thermal change layers having different threshold temperatures. Furthermore, of the laminated thermal change layers, a thermal change layer having a higher threshold temperature may be disposed closer to the recording/reproducing layer.

The present invention also provides a thermomagnetic recording and reproducing method which includes recording information by applying a magnetic field from a magnetic head to a thermomagnetic recording medium having at least a recording/reproducing layer and a thermal change layer with applying a light beam to the thermomagnetic recording medium from an optical pickup and reproducing information by reading light or the magnetic field through a reproducing head with applying the light beam, the method comprising setting a magnetic recording or reproducing temperature higher than temperature at the circumference of a light spot formed by the application of the light beam and equal to or higher than a temperature at which the thermal conductivity of the thermal change layer changes.

Further, in the thermomagnetic recording medium used in a thermomagnetic recording device, the threshold temperature of the change of the thermal conductivity of the thermal change layer may be higher than the temperature at the circumference of the light spot. The thermomagnetic recording device is constructed to have the above-described thermomagnetic recording medium, the above-described thermomagnetic recording and reproducing method, thee optical pickup and the magnetic head.

As materials for the thermal change layer of the invention, may be used $(V_{1-x}Cr_x)_2O_3$ wherein X is 0.51 and $La_{1-x}Sr_xMn_{1+y}O_3$ wherein X is 0.2 to 0.4 and Y is 0.01 to 0.1, for example.

The recording media and recording device of the present invention is now described in the following order:
(a) Principle of the change of the thermal conductivity induced by the metal-to-insulator transition;
(b) Control of the temperature distribution by use of the thermal change layer;
(c) Laminated structure of the thermal change layer;
(d) Recording and reproducing method;
① Optically assisted magnetic recording;
② Magneto-optical recording.

(a) Principle of the Change of the Thermal Conductivity Induced by the Metal-to-insulator Transition The inventors have found out that it is possible to obtain a sharp change of the thermal conductivity while providing an excellent reliability (reliability in repeated use and the like) to the recording medium by utilizing the metal-to-insulator transition which is a solid-to-solid phase transition and have made the invention.

FIG. 2(*a*) is a chart showing a relationship of resistivity to temperature, in which the temperature is plotted in abscissa and the resistivity is plotted in ordinate. It is shown that the resistivity is small on a lower temperature side of a metal-to-insulator transition temperature Tc and rises sharply on a higher temperature side of Tc.

FIG. 2(*b*) is a chart showing dependency of thermal conductivity on temperature of a material exhibiting the metal-to-insulator transition shown in FIG. 2(*a*). In FIG. 2(*b*), the temperature is plotted in abscissa and the thermal conductivity is plotted in ordinate. It is shown in FIG. 2(*b*) that the thermal conductivity drops sharply after the transition temperature Tc is reached. In other words, the thermal conductivity has a threshold temperature, which is substantially identical to the transition temperature Tc of a metal insulator. The thermal conductivity is large on the lower temperature side of the threshold temperature Tc and falls sharply and greatly (by one to two digits) on the higher temperature side of the threshold temperature Tc. In the following description, Tc is referred to as a threshold temperature.

It is now explained why the metal-to-insulator transition brings about a great change in the thermal conductivity at the threshold value as shown in FIGS. 2(*a*) and 2(*b*), directing attention to the thermal conductivity of carriers and a lattice.

The thermal conductivity of metals is usually in inverse proportion to the resistivity. That is because the thermal conductivity is mainly owing to the thermal conductivity of carriers. This is known as Wiedemann-Franz law.

On the other hand, the resistivity and thermal conductivity of insulators do not have such relation as recognized in metals. This is because, in insulators, carriers hardly serve to conduct heat but a lattice contributes to the thermal conductivity mostly. Heat is scattered by a nonlinear lattice and prevented from being conducted. The thermal conductivity of insulators depends on to what degree the lattice is nonlinear.

However, in materials exhibiting the metal-to-insulator transition, the thermal conductivity depends on carriers in a metallic phase and on a linear degree of the lattice in an insulative phase, as detailed above. Near the metal-to-insulator transition point, the carriers contributing to electrical conductivity in the metallic phase change into a localizing state because of their strong interaction, and thereby the resistivity increases significantly. This leads to a rapid drop in contribution of the carriers to the thermal conductivity, and in turn the lattice affects the thermal conductivity almost entirely. At that time, since the lattice is largely in a nonlinear state, the thermal conductivity drops greatly in the insulative phase.

In the materials exhibiting the metal-to-insulator transition, as understood from the fact that they are called strong correlation electron substances, interaction between electrons is extremely strong (i.e., extremely nonlinear). This strong nonlinear property results in a considerably nonlinear property of the lattice. In other words, by applying the metal-to-insulator transition to the principle of the change of the thermal conductivity, the thermal conductivity is high in the metallic phase (on the lower temperature side of Tc in FIG. 2(*b*)), and falls greatly in the insulative phase which is on the other side of the transition point (on the higher temperature side of Tc in FIG. 2(*b*).

A sharp change of the thermal conductivity can be obtained by utilizing the sharp metal-to-insulator transition, and a large change of the thermal conductivity can be obtained by selecting a material exhibiting a large change of the resistivity at the metal-to-insulator transition.

Further, since the metal-to-insulator transition is a solid-to-solid phase transition, lattice constant change only slightly at the phase transition. Therefore, a high reliability is maintained after repeated use.

Furthermore, this metal-to-insulator transition takes place extremely rapidly (nsec. or faster), a sufficiently fast response can be obtained with the thermal change layer for use in memories required to allow high-speed recording and reproduction.

As described above, a sharp, large and fast change of the thermal conductivity can be obtained by employing the metal-to-insulator transition as the principle for the change of the thermal conductivity. Also it is possible to produce a thermal change layer which remains highly reliable after repeated use.

Figure 2A:
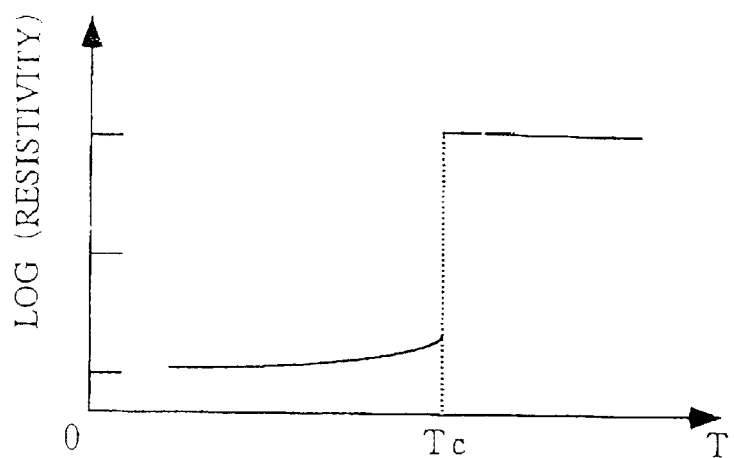
FIG. 2(a) is a chart showing dependence on temperature of resistivity of a material exhibiting a metal-to-insulator transition in accordance with the present invention.
Figure 2B:
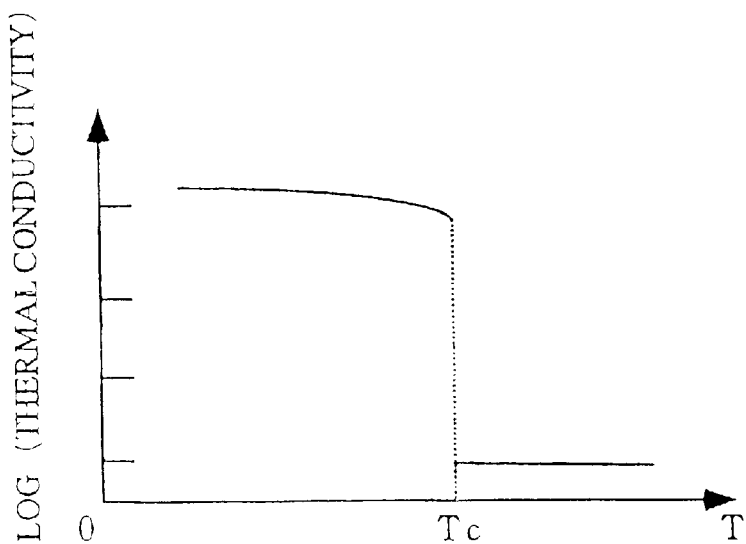
FIG. 2(b) is a chart showing dependence on temperature of thermal conductivity involved in the metal-to-insulator transition in accordance with the present invention.

By use of this thermal change layer, the temperature distribution in the light spot can be steep, which allows high density through super resolution. Further, by use of the metal-to-insulator transition in which the thermal conductivity is low on the higher temperature side of the threshold temperature (Tc) and high on the lower temperature side thereof (i.e., the metallic phase is on the lower temperature side and the insulative phase is on the higher temperature side, as shown in FIGS. 2(a) and 2(b)), it is possible to realize a recording and reproducing process in which thermal characteristics in the same region is such that the temperature raises rapidly when heated over the threshold temperature and drops rapidly when cooled below the threshold temperature.

That is, materials are required to have a low thermal conductivity from the viewpoint of recording sensitivity and a high thermal conductivity for quick heat radiation from the viewpoint of reliability. The present invention can fill these contradicting thermal characteristics. Further, the invention eliminates problems of the expansion of a bit edge and jitters which are considered to be generated by heat accumulation at rewriting a lot of times, for improving the reliability.

As materials exhibiting such a metal-to-insulator transition to the metallic phase on the lower temperature side and to the insulative phase on the higher temperature side, known are alloys and oxides. For example, a material $(V_{1-x}Cr_X)_2O_3$ wherein X is about 0.51 provided by adding Cr as an impurity to vanadium oxide which is known to have a corundum structure has a transition temperature around 130° C. Recently, oxides having a perovskite structure have become known, especially including $La_{1-x}Sr_xMn_{1+y}O_3$ wherein X is 0.2 to 0.4 and y is 0.01 to 0.1. With materials of this type, the transition temperature can be varied successively from room temperature to about 250° C. by increasing the dope amount X of Sr or the dope amount Y of Mn. Accordingly, the transition temperature can be adjusted within the recording and reproducing temperature range. These materials are suitable for the thermal change layer for magneto-optical recording and for optically assisted magnetic recording.

(b) Control of the Temperature Distribution by use of the Thermal Change Layer

Next, explanation is given of control of the temperature distribution smaller than the light spot by use of the thermal change layer 5.

Figure 3:
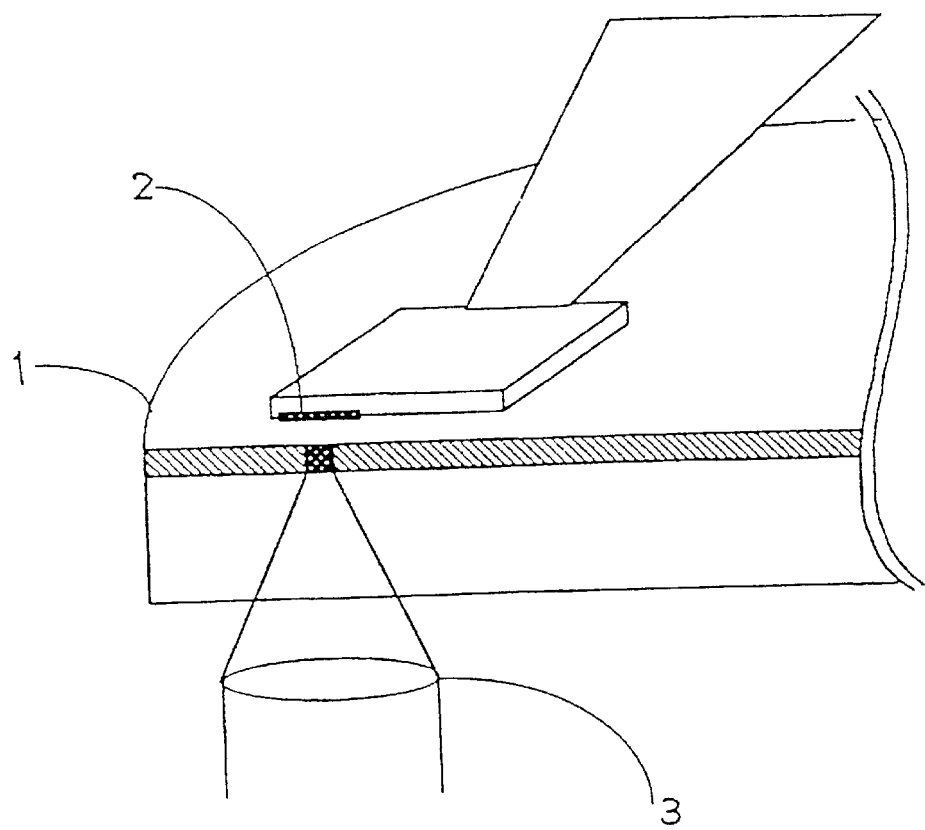
FIG. 3 is a schematic sectional view illustrating a thermomagnetic recording and reproducing in accordance with the present invention.

FIG. 3 is a schematic sectional view illustrating the thermomagnetic recording and reproducing method of the present invention. As shown in FIG. 3, a recording medium (disk) 1 is sandwiched by a magnetic head 2 above and an optical pickup 3 below.

Figure 4:
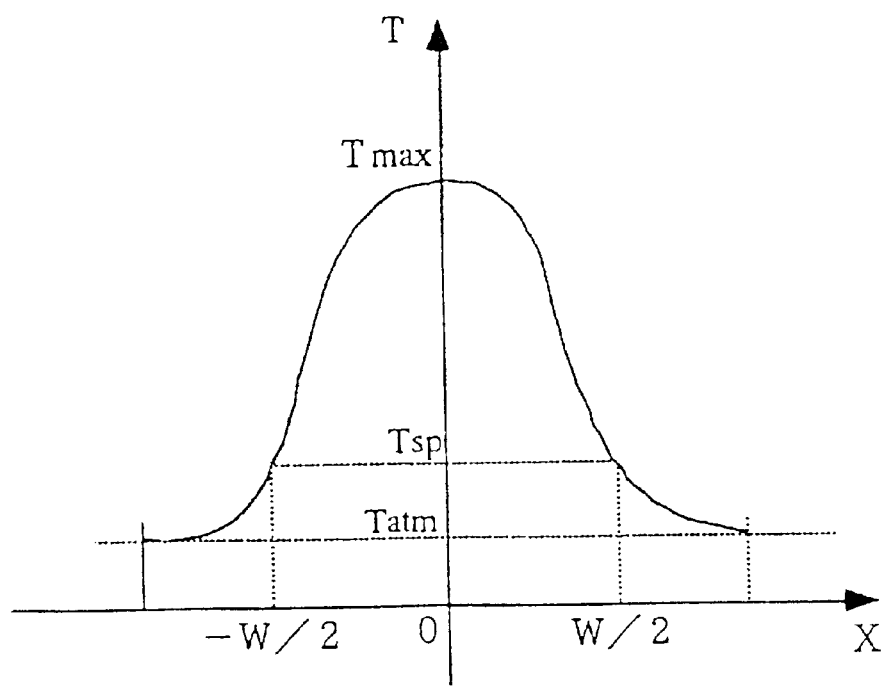
FIG. 4 is a chart showing a temperature distribution formed on a recording medium in accordance with the present invention.

First, it is explained how the temperature distribution is formed where a thermal change layer 5 is not used. FIG. 4 shows a temperature distribution formed by a light spot applied onto the recording medium 1 from the optical pickup 3. The abscissa represents a direction X of the width of a track (corresponding to a radial direction of the disk), and the ordinate represents temperature T. For simplicity of explanation, the light spot is assumed to be circular and a light intensity distribution is assumed to be a Gauss distribution. The diameter of the light spot is represented by W (defined as a range where the light intensity is not lower than $1/e^2$. Tmax represents the maximum temperature reached in the light spot and Tsp represents temperature at the circumference of the light spot, i.e., representing temperature at X=W/2 and −W/2 in FIG. 4. It is noted that the temperature of the recording medium 1 away from the light spot is assumed to be an ambient temperature Tatm where the recording medium is used.

Next, it is explained how the temperature distribution is formed where the thermal change layer 5 is used. Here, for simplicity of explanation, the thermal change layer 5 is assumed to be adjacent to the recording/reproducing layer.

Figure 5:
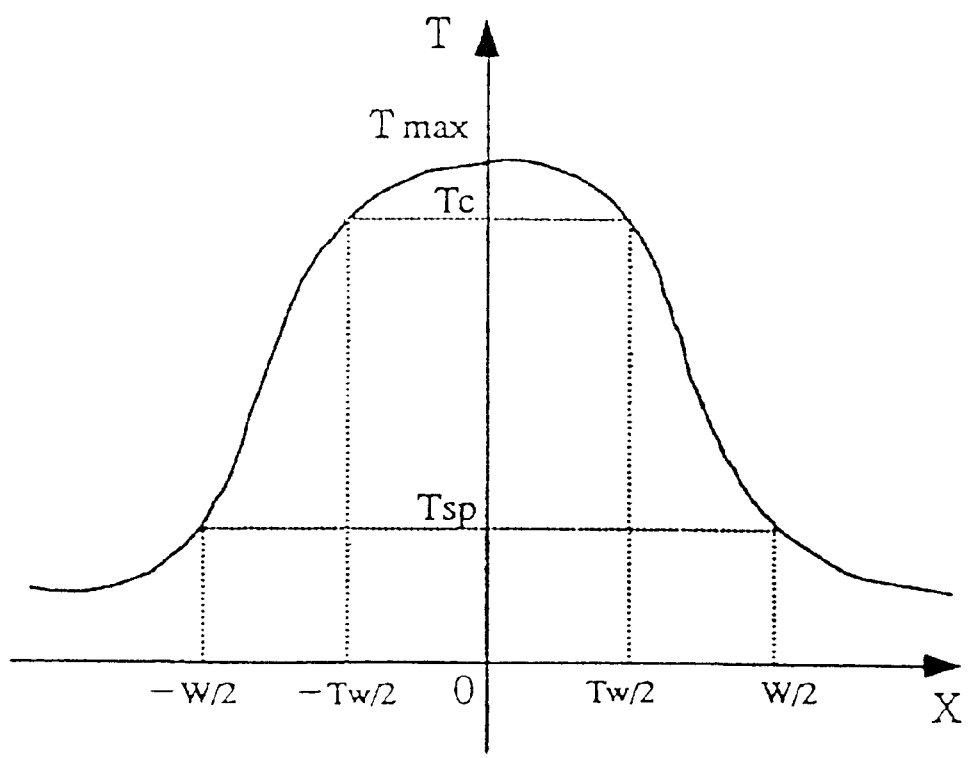
FIG. 5 is a chart showing a relationship of a temperature distribution formed on a recording medium to a threshold temperature in accordance with the present invention.

FIG. 5 shows a temperature distribution which is supposed to be formed by a light spot applied onto the recording medium 1 from the optical pickup 3 if the thermal change layer 5 does not exist. The abscissa represents the width direction X of the track, and the ordinate represents temperature T. Tmax and Tsp have the same meaning in FIG. 4. The threshold temperature of the thermal change layer 5 is represented by Tc (Tmax>Tc>Tsp). The width Tw of a region corresponding to Tc represents a region 6 where the thermal conductivity drops in the thermal change layer 5 and ranges from −Tw/2 to Tw/2 with the center of the light spot at the origin.

Figure 6:
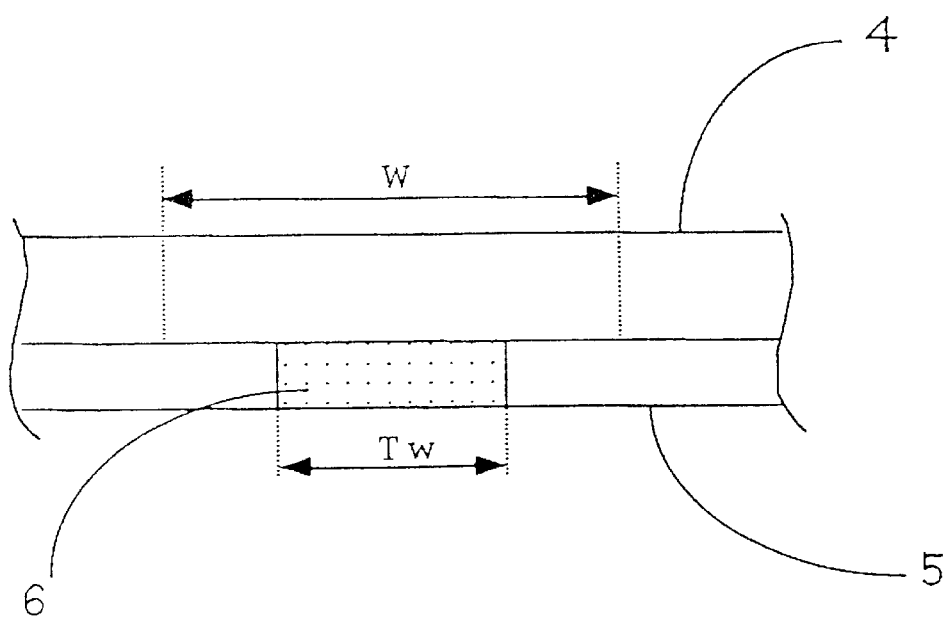
FIG. 6 is a schematic sectional view of a recording/reproducing layer and a thermal change layer in accordance with the present invention.

This state is described again with reference to a schematic sectional view of the recording/reproducing layer 4 and the thermal change layer 5 shown in FIG. 6. Here, shown is an example in which the thermal change layer 5 is disposed on a light incident side. That is, shown are the region W corresponding to the light spot in the case where the thermal change layer 5 is not present and the region Tw corresponding to the region 6 where the temperature exceeds the threshold temperature Tc and the thermal conductivity drops.

Figure 7:
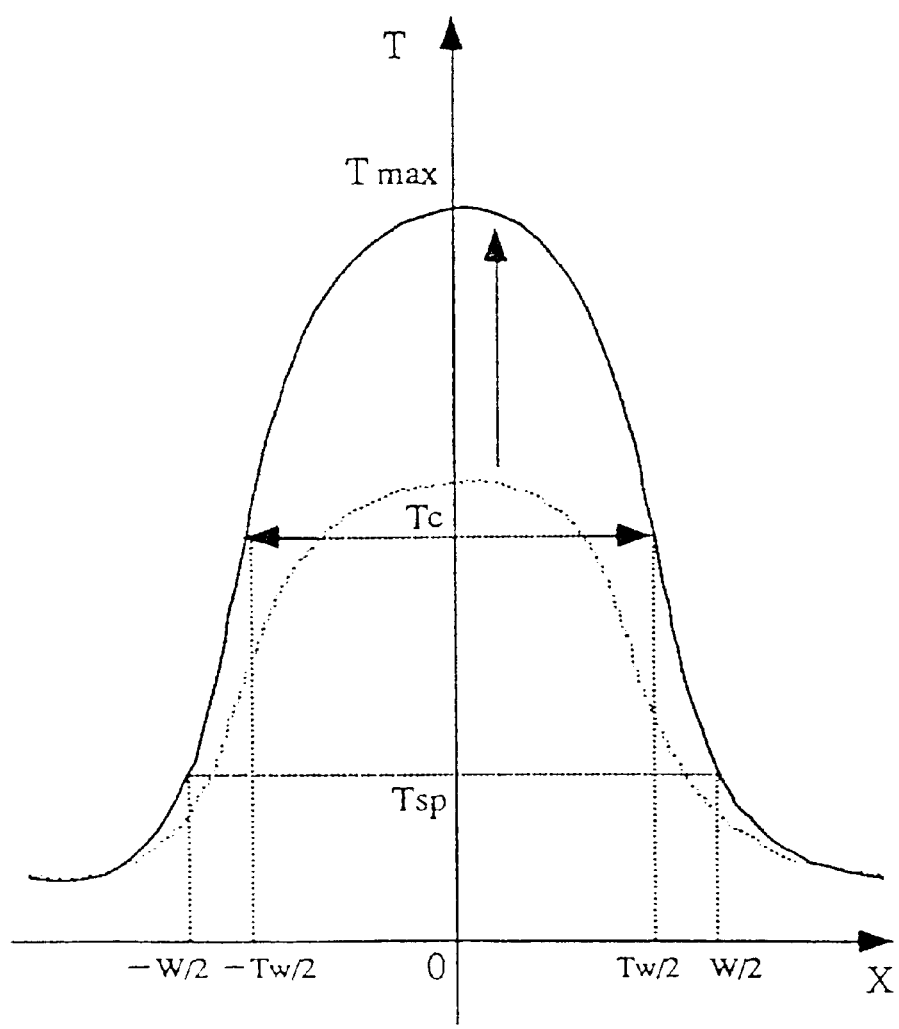
FIG. 7 is a chart showing a temperature distribution formed on a recording medium using a thermal change layer in accordance with the present invention.

Now it is explained how the temperature distribution changes in the recording/reproducing layer 4 in the case where the thermal change layer 5 is used. In FIG. 7, a solid line lei represents a temperature distribution formed when the same laser power as applied in the case of the absence of the thermal change layer 5 is applied. The abscissa represents the width direction X of the track, and the ordinate represents temperature T. Each symbol has the same meaning as in FIG. 5. A dotted line represents the temperature distribution in the case where the thermal change layer 5 is assumed to be absent as shown in FIG. 5, for comparison. Arrows in the figure indicate changes in the temperature distribution owing to the presence of the thermal change layer 5. The use of the thermal change layer 5 raises the maximum temperature Tmax as well as the temperature at the circumference of the light spot ±W/2 at the irradiation of light of the same power.

Figure 8:
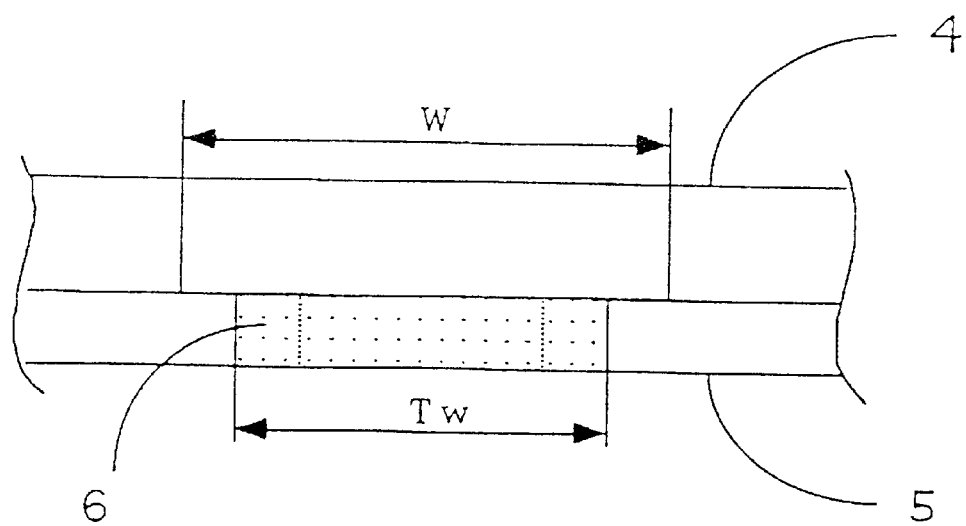
FIG. 8 is a schematic sectional view of a recording/reproducing layer and a thermal change layer in accordance with the present invention.

FIG. 8 is a schematic sectional view of the recording/reproducing layer 4 and the thermal change layer 5 when heated, showing the expansion of the width Tw of the region 6 which is heated over Tc and has a dropped thermal conductivity. In the cross-section of the thermal change layer 5, dotted lines indicate the width of a region where the thermal conductivity is assumed to fall in the case where the thermal change layer 5 does not exist, and solid lines indicate the width of the region 6 where the thermal conductivity drops in the case where the thermal change layer 5 is used.

Figure 9A:
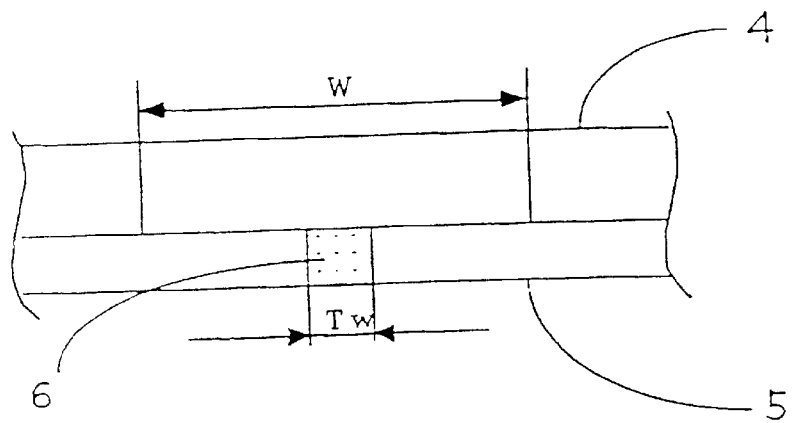
FIGS. 9(a) to 9(c) are schematic sectional views illustrating in order the occurrence of a region where thermal conductivity declines in accordance with the present invention.
Figure 9B:
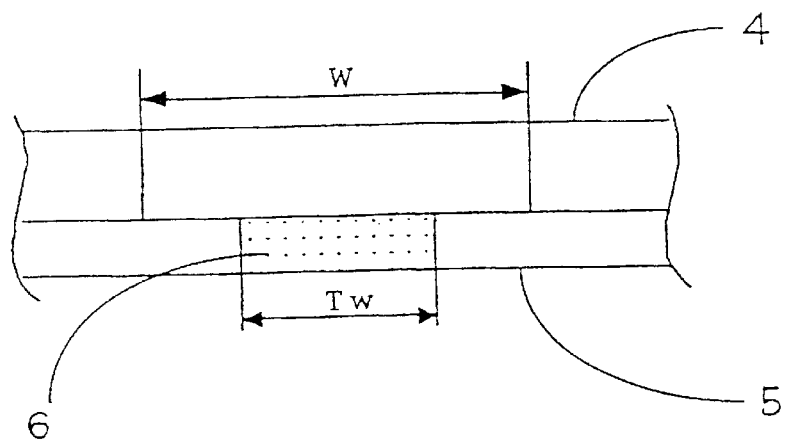
Figure 9C:
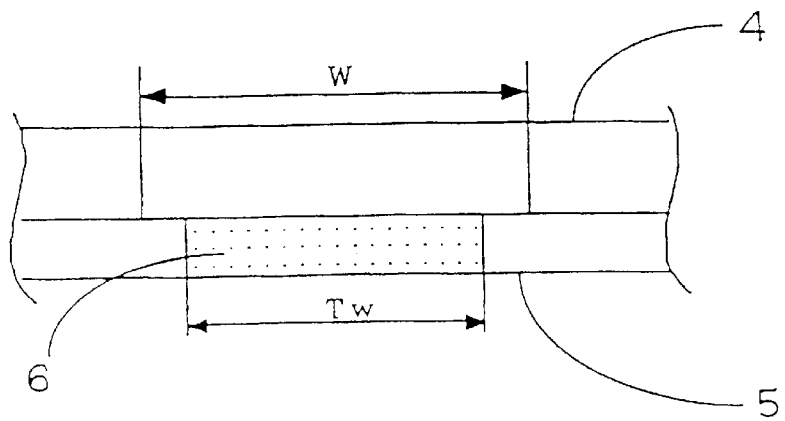

It is now described in detail how the thermal conductivity drop region 6 is formed in the thermal change layer 5 with reference to FIGS. 9(a) to 9(c) which are schematic sectional views of the recording/reproducing layer 4 and the thermal change layer 5. The temperature within the light spot rises on irradiation of light, forming a temperature distribution having the highest temperature at the center. When the maximum temperature exceeds Tc, the thermal conductivity drop region 6 appears as shown in FIG. 9(a). Subsequently, since the thermal conductivity in this region is lowered, the temperature in this region rises and accordingly the temperature within the light spot rises. With repeating this process of the appearance of the thermal conductivity drop region 6 due to a temperature rise and another temperature rise due to the drop of the thermal conductivity, the thermal conductivity drop region 6 expands as shown in FIG. 9(b). At last, the temperature distribution reaches a balanced state, defining the thermal conductivity drop region 6 having the width Tw as shown in FIG. 9(c).

Thus, it is understood that, where the thermal change layer 5 is used, the width of the thermal conductivity drop region 6 is determined while the occurrence of the thermal conductivity drop region 6 and the consequent temperature rise are repeated, and that the temperature distribution can be controlled according to the width of the thermal conductivity drop region 6.

Next, it is described in further detail how the temperature distribution is controlled within a region smaller than the light spot.

Referring to FIG. 1, a solid line indicates a temperature distribution formed on the recording medium 1 using the thermal change layer 5 when the laser power is so adjusted that the maximum temperature reached is substantially the same as in the case without the thermal change layer 5. The abscissa represents the width direction X of the track, and the ordinate represents temperature T. Each symbol has the same meaning as in FIG. 5. A dotted line represents the temperature distribution in the case where the thermal change layer 5 is assumed to be absent as shown in FIG. 5, for comparison. Arrows in the figure indicate changes in the temperature distribution owing to the presence of the thermal change layer 5, showing that the temperature changes sharply at the positions $\pm Tw/2$.

By utilizing the thermal change layer 5 which allows the same maximum temperature (as obtained by irradiation of light at a power used in the case where the thermal change layer 5 is not used) to be obtained by irradiation of light at a lower power, it is possible to select conditions for the power of laser light which would not raise the temperature much (e.g., 30 to 40° C.) without the thermal change layer 5. Therefore, the temperature of a region in the light spot where the thermal conductivity is not decreased can be prevented from rising, and the temperature of the thermal conductivity drop region 6 alone is raised. That is, it is possible to raise the temperature only of the region which is smaller than the light spot.

Figure 10A:
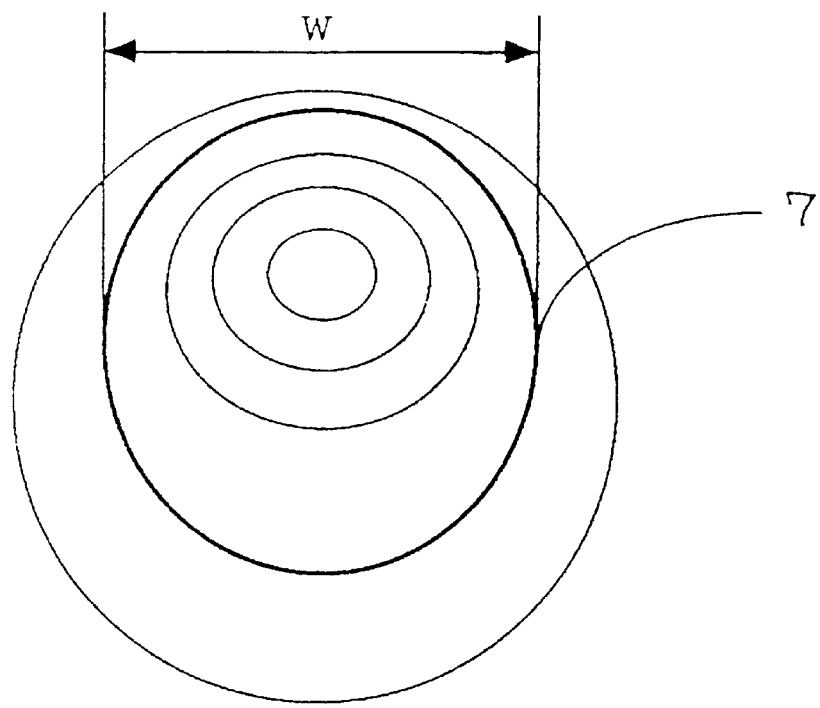
FIG. 10(a) is a schematic plan view showing a temperature distribution with isothermal lines formed in the case where a thermal change layer does not exist in accordance with the present invention.
Figure 10B:
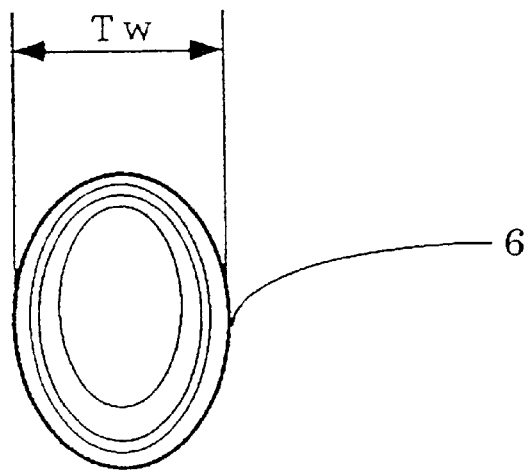
FIG. 10(b) is a schematic plan view showing a temperature distribution with isothermal lines formed in the case were a thermal change layer is used in accordance with the present invention.

This state is described again with reference to FIGS. 10(a) and 10(b). FIGS. 10(a) and 10(b) are plan views of temperature distributions formed on the recording medium 1 as seen from a direction perpendicular to the surface of the medium, with isothermal lines showing the steepness of the distributions. FIG. 10(a) represents the case without the thermal change layer 5, and FIG. 10(b) represents the case with the thermal change layer 5. As shown in FIG. 10(a), where the thermal change layer 5 is absent, the temperature distribution becomes steep near ends of a width W which corresponds to the diameter of the light spot. On the other hand, as shown in FIG. 10(b), where the thermal change layer 5 is present, the temperature distribution becomes steep within a range smaller than the light spot, the range corresponding to the width Tw of the thermal conductivity drop layer 6.

Thus, it is understand to be possible to record at high density within a smaller region than the light spot and to reproduce signals from a track or a recorded mark smaller than the light spot without cross-talk, by using the thermal change layer 5 to form a steep temperature distribution within a range smaller than the light spot and setting the recording or reproducing temperature at Tc or higher.

Next, it is explained how the steep temperature distribution thus formed is cooled after the light irradiation is stopped or after a light irradiating zone is passed.

Figure 11A:
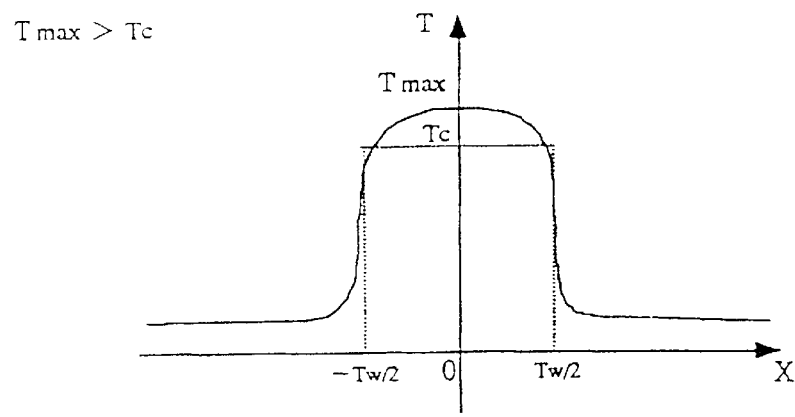
FIGS. 11(a) to 11(c) are charts illustrating in order a cooling process after light irradiation is stopped in the case where a thermal change layer is used in accordance with the present invention.

FIG. 11(a) shows a state at the moment the light irradiation is stopped, when the maximum temperature Tmax in the light spot is higher than the threshold temperature Tc and the width Tw of the thermal conductivity drop region 6 is maintained. The abscissa represents the width direction X of the track, and the ordinate represents temperature T.

Figure 11B:
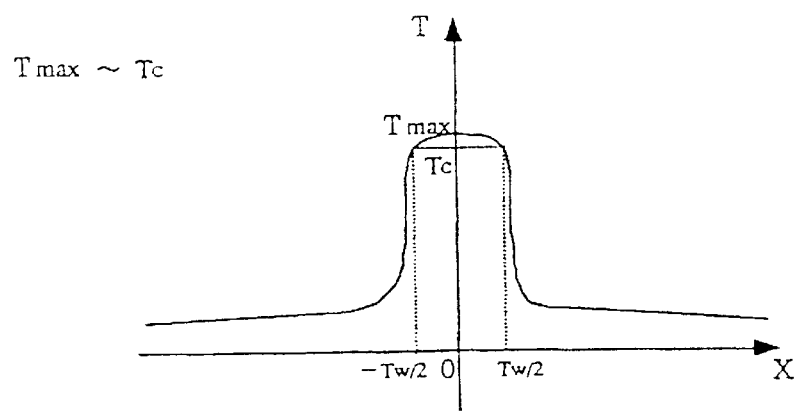
Figure 11C:
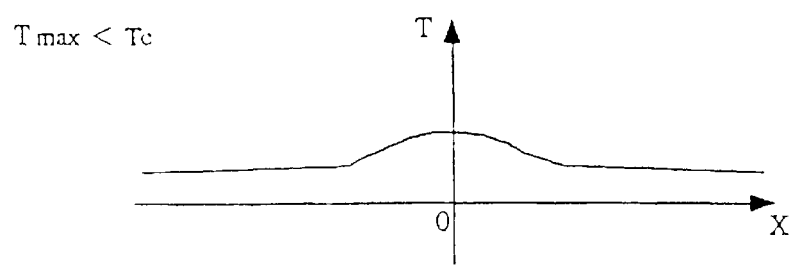

Next, described is the process of temperature falling within the region where the light spot is formerly formed, after stopping the light irradiation. FIG. 11(b) shows a state in which the maximum temperature Tmax drops to substantially the same level as Tc. As the maximum temperature Tmax declines, temperature at the positions $\pm Tw/2$ shown in FIG. 11(a) also declines. Thereby, the width Tw of the thermal conductivity drop region 6 also begins to decrease. This accelerates the declining of the temperature of the thermal conductivity drop region 6 from its periphery, and the thermal conductivity drop region 6 shrinks further more. This decrease of the width Tw of the thermal conductivity drop region 6 traces back the formation (a) to (c) of the thermal conductivity drop region 6 shown in FIGS. 9(a) to 9(c), i.e., it follows (c) to (a) reversely. Finally, when the maximum temperature Tmax falls below Tc in the entire area, the thermal conductivity drop region 6 disappears.

This cooling process is descried again. After the light irradiation stops, temperature drops within the region where the light spot is previously formed, and the region whose temperature is higher than Tc shrinks rapidly from the periphery thereof. With this, temperature falls quickly, and when temperature becomes below Tc in the entire area, the thermal conductivity drop region 6 vanishes. The cooling process proceeds speedily.

As detailed above, by use of the thermal change layer 5 of the present invention, since the recording sensitivity can be improved and temperature can be raised by irradiation of light of a low power, a steep temperature distribution can be formed within a region smaller than the light sport, and recording and reproduction at high density can be realized. Further, if the thermal conductivity remains low after the light irradiation stops, the cooling process is merely a gradual cooling process because of heat accumulation. According to the present invention, however, since the thermal conductivity returns to a high state (a state in which the temperature is hardly raised by irradiation of light) at a temperature of Tc or lower after the light irradiation stops, a rapid cooling is obtained. Thereby, both the improvement of the recording sensitivity and the avoidance of the heat accumulation can be realized at the same time, and the misplacement and deformation of recording marks can be prevented, which enables a high-density recording excellent in recording and reproduction characteristics.

(c) Laminated Structure of the Thermal Change Layer

Next, explanation is given to the case of the thermal change layer 5 including laminated thermal change layers having different threshold temperatures.

In this explanation, a first thermal change layer 8 has a first threshold temperature Tc1 and a second thermal change layer 9 has a second threshold temperature Tc2 (Tc2>Tc1). The second thermal change layer 9, i.e., a layer having a higher threshold temperature, is disposed nearer to the recording/reproducing layer 4.

Figure 12:
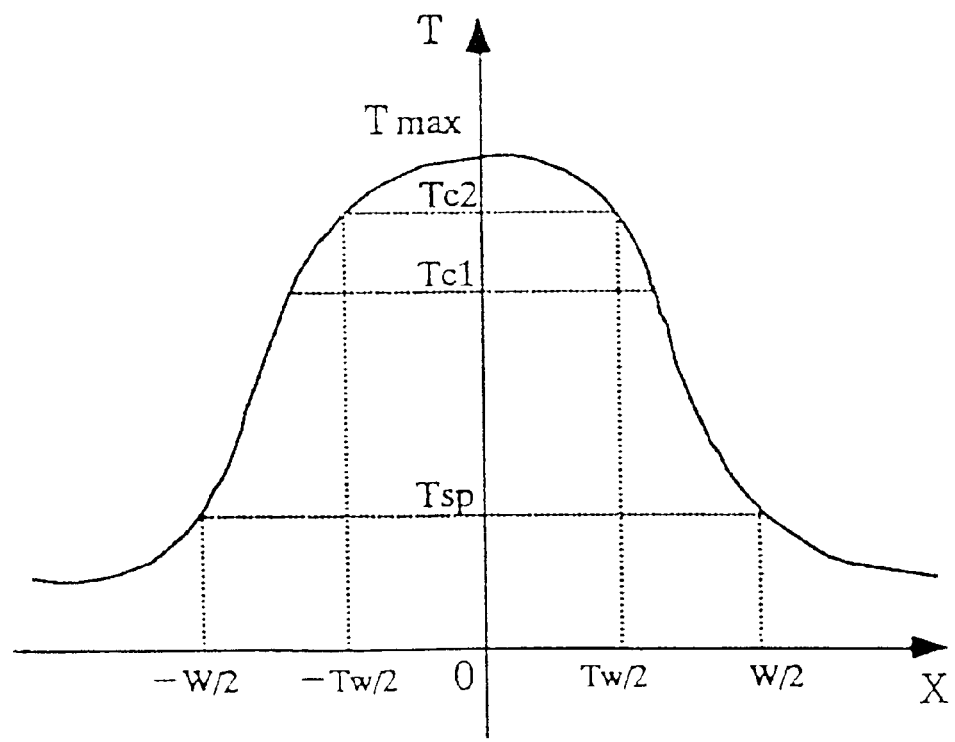
FIG. 12 is a chart showing a relationship of a temperature distribution formed on a recording medium of laminated thermal change layers having different threshold temperatures to threshold temperatures in accordance with the present invention.

FIG. 12 shows a temperature distribution formed by the light spot applied onto the recording medium 1 from the optical pickup 3 where the thermal change layer 5 does not exist. The abscissa represents the width direction X of the track, and the ordinate represents temperature T. The recording and reproducing temperatures are Tc2 and Tc1, respectively, both being set higher than temperature Tsp at the circumference of the light spot (Tc2>Tc1>Tsp).

Figure 13:
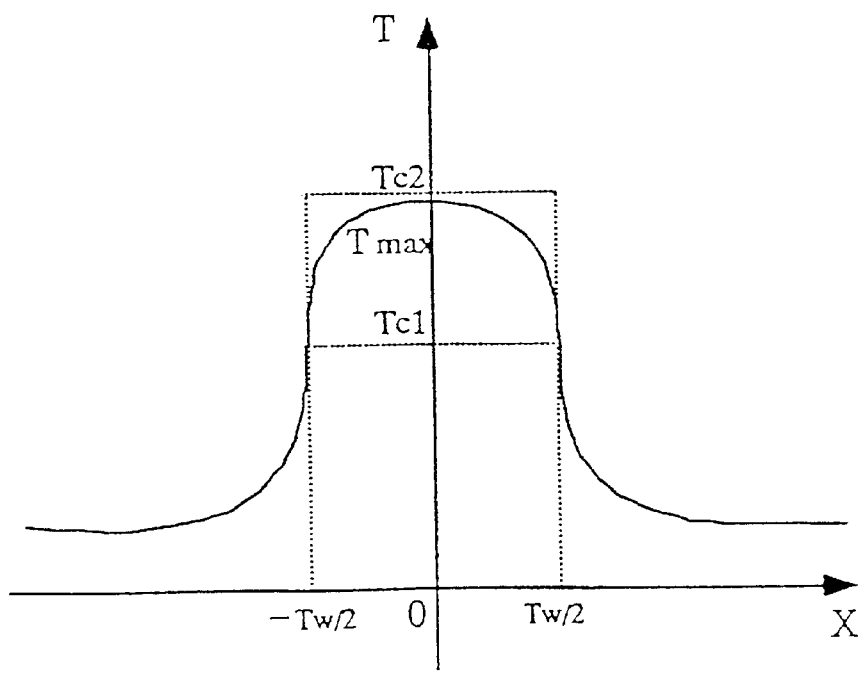
FIG. 13 is a chart showing a temperature distribution formed on a recording medium in the case where the highest temperature reached is Tc2 or lower in accordance with the present invention.

First, explanation is given of reproduction. Light is applied so that the maximum temperature in the light Spot comes between Tc1 and Tc2 (inclusive). The temperature distribution of the recording medium 1 is shown in FIG. 13. Also, in FIG. 13, the abscissa represents the width direction X of the track, and the ordinate represents temperature T. As already detailed, the first thermal change layer 8 has the effect of restricting the rise of the temperature only within the range (from −Tw/2 to Tw/2) smaller than the light spot.

Figure 14:
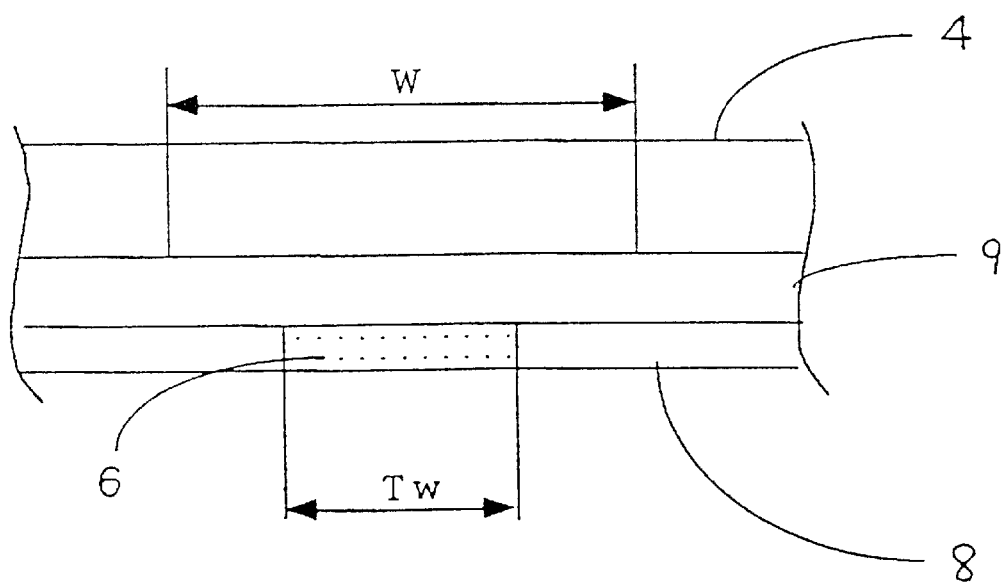
FIG. 14 is a schematic sectional view of a recording/reproducing layer, a first thermal change layer and a second thermal change layer in accordance with the present invention.

FIG. 14 is a schematic sectional view of the recording/reproducing layer 4, the first thermal change layer 8 and the second thermal change layer 8 when heated. A region exhibiting a steep temperature distribution is almost identical to the thermal conductivity drop region 6 (of width Tw) of the first thermal change layer 8. At this time, since the second thermal change layer 9 does not reach the threshold temperature Tc2, the thermal conductivity drop region 6 does not occur therein, and therefore, the second thermal change layer 9 does not contribute to the temperature distribution.

Next, explanation is given of recording. When the maximum temperature in the light spot becomes Tc1 or higher, the thermal conductivity drop region 6 is formed in the first thermal change layer 8, and the region whose temperature rises to Tc1 or higher expands. Further, when the maximum temperature in the light spot becomes Tc2 or higher, the thermal conductivity drop region 6 also begins to form in the second thermal change layer 9. It is noted that the thermal conductivity drop region 6 in the second thermal change layer 9 is smaller than the thermal conductivity drop region 6 in the first thermal change layer 8. Finally, the balanced state is reached, and the width of the thermal conductivity drop region 6 in the second thermal change layer 9 is determined.

Figure 15:
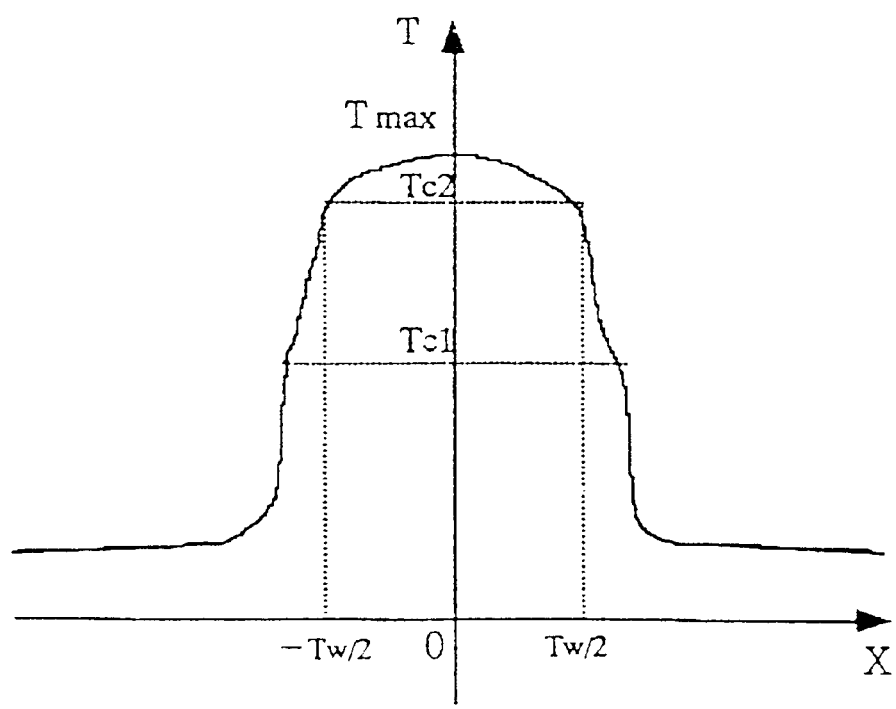
FIG. 15 is a chart showing a temperature distribution formed on a recording medium in the case where the highest temperature reached is Tc2 or higher in accordance with the present invention.
Figure 16:
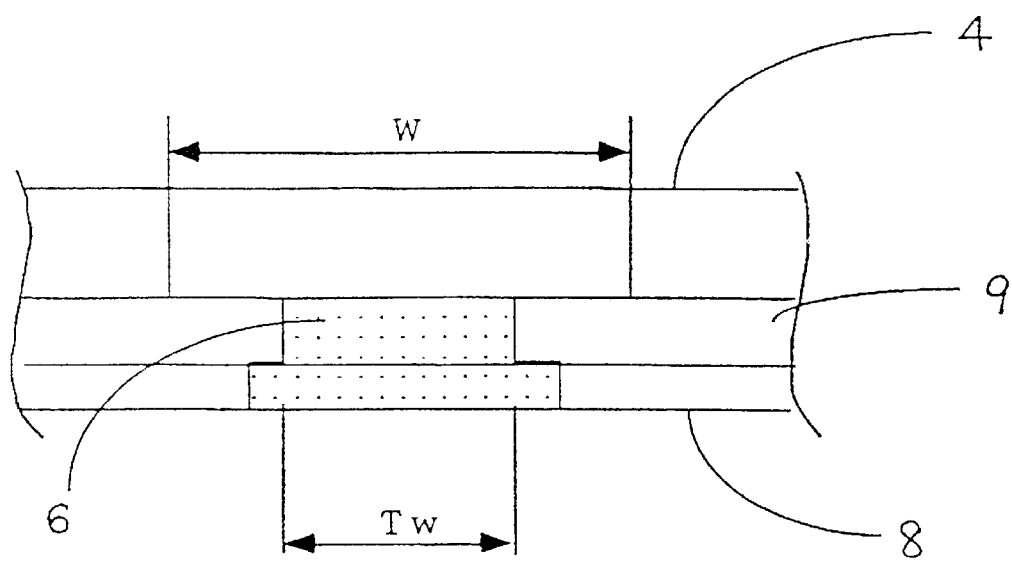
FIG. 16 is a schematic sectional view of a recording/reproducing layer, a first thermal change layer and a second thermal change layer in accordance with the present invention.

This state is illustrated in FIGS. 15 and 16. FIG. 15 shows a temperature distribution on the recording medium 1, in which the abscissa represents the width direction X of the track, and the ordinate represents temperature T. FIG. 16 is a schematic sectional view of the recording/reproducing layer 4, the first thermal change layer 8 and the second thermal change layer 9 when heated. In the first thermal change layer 8, the thermal conductivity drop region 6 in which the maximum temperature is Tc2 or lower (i.e., that at reproduction) is extended, and the width of the thermal conductivity drop region 6 in the second thermal change layer 9 is still within a rang smaller than the thermal conductivity region 6 in the first thermal change layer 8.

Here, the second thermal change layer 9 having a higher threshold temperature is disposed in the thermal change layer 5 near to the recording/reproducing layer 4, which means that the layer having a smaller thermal conductivity drop layer 6 is located nearer to the recording/reproducing layer 4. Since a layer which is adjacent to the recording/reproducing layer 4 and has the lowest thermal conductivity is the most effective as the thermal change layer 5, the above-mentioned disposition is more suitable for steepening the temperature distribution than the disposition of a thermal change layer 5 having a lower threshold temperature nearer to the recording/reproducing layer 4.

As detailed above, by laminating the thermal change layers 5 having different threshold temperatures, it is possible to obtain steep temperature distributions at recording and reproduction within a smaller area than the light spot even if different temperatures are set as the recording and reproducing temperature. Further, if Tc2 and Tc1 are chosen as the recording temperature and the reproducing temperature (Tc2>Tc1), respectively, the temperature rises in a larger area at recording than at reproducing, and therefore, signals can be reproduced without noises from track edges.

(d) Examples of Recording and Reproduction

Next, described are examples of recording and reproduction using the thermal change layer.

① Optically assisted magnetic recording

Figure 17:
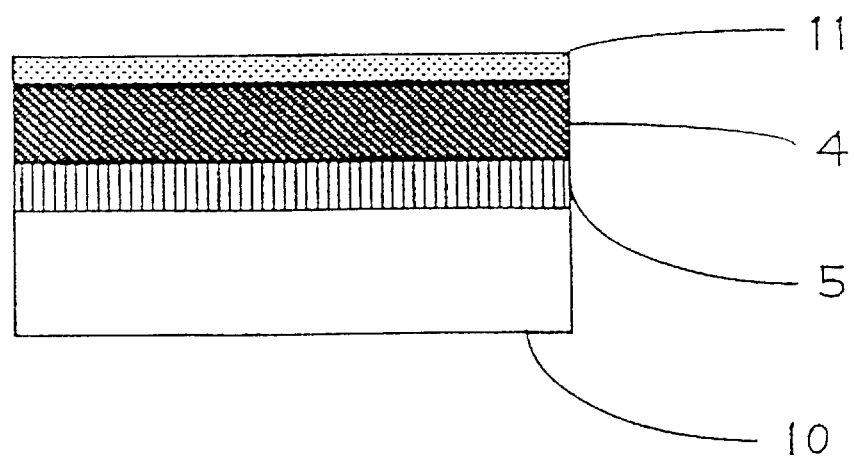
FIG. 17 is a schematic sectional view of a thermomagnetic recording medium used in an embodiment in accordance with the present invention.

First, explanation is given as to how to form a magneto-optical recording medium. A thermal change layer 5 having a threshold temperature of about 150° C. was formed to a thickness of 100 nm on a sapphire single-crystal substrate 10 of 2.5 inches φ (outer diameter: 65 mm, inner diameter 20 mm, thickness: 0.635 mm). The thermal change layer 5 was formed by sputtering of $La_{1-x}Sr_xMnO_3$ in which the amount of Mn is increased. On the thermal change layer 5, a recording/reproducing layer 4 was formed of a film of TbFeCo having a compensation point at around room temperature to a thickness of 100 nm by sputtering. On the top, a protective film 11 was formed of a diamond-like carbon film in a thickness of 20 nm, and a lubricant (not shown) was applied. FIG. 17 shows a schematic cross-section of the medium.

Measurement by a vibrating sample magnetometer (VSM) showed-that the recording/reproducing layer 4 had a residual magnetization of 11 (emu/cc) at room temperature 25° C., 125 (emu/cc) at the threshold voltage 150° C. and 148 (emu/cc) at 200° C., and a coercivity of 10 k (Oe) or more at room temperature 25° C., 3.6 k (Oe) at 150° C. and 1.8 k (Oe) at 200° C.

A system used for evaluation was provided with a magnetic head 2 in an upper part and an optical pickup 3 in a lower part as sandwiching the recording medium (disk) 1. As the magnetic head 2, used was a merged magnetoresistance (MR) head having a recording head width of 5 μm, a reproducing head width of 4.5 μm, a recording gap length of 0.35 μm and a reproducing gap length of 0.22 μm. The optical pickup 3 has a wavelength of 650 nm and a beam diameter of 1.1 μm in the width direction of the track.

Recording and reproducing test was conducted with irradiating the above-described recording medium with light using the above-described magnetic head and optical pickup under the conditions of a disk rotation rate of 3,600 rpm, a linear velocity of 11 m/s, a recording frequency of 10 MHz and a magnetic head flying height of about 50 nm.

The magnetic head 2 and the optical pickup 3 were adjusted in position so that a region heated by a light spot overlaps a region to which the magnetic head 2 applies an electric field. First, for comparison, the recording and reproducing test was carried out on a recording medium 1 not provided with the thermal change layer 5. The power of a light beam at recording and reproduction was set to 6 mW.

Observation of a recording track with a polarizing microscope showed that the width thereof was about 1.0 μm under the above-mentioned conditions and was substantially determined by the light spot diameter.

Next, the recording, and reproducing test was carried out on a recording medium 1 provided with the thermal change layer 5. The investigation of the power for recording showed that a track of 0.5 μm width was formed at 3 mW, i.e., the recording sensitivity was able to be improved and a narrower track than the light spot was able to be formed.

Further observation of a magnetic domain with a polarizing microscope showed the formation of clear recorded bits free from blur at edges of the track and the bits. This is considered because disorder in the magnetic domain was inhibited by rapid cooling in the cooling process during the formation of the bits.

Further, tracks of 0.5 μm width were thus formed at a 0.6 μm pitch and then reproduced. At that time, first, a track was formed at a recording frequency of 5 MHz and tracks were formed at a recording frequency of 2 MHz on both sides thereof. Thereafter signals were reproduced from the track recorded at 5 MHz on which the light spot and the magnetic head were arranged to fall in the same region. The 5 MHz signals were reproduced with a C/N value of about 35 dB, which was substantially the same as in the case of a single track, and 2 MHz signals which were mixed signals were reproduced with a C/N value of about 3 dB. That showed a sufficiently low cross talk. In the optically assisted magnetic recording, a temperature shift from the compensation temperature causes cross talk, that is, the temperature distribution determines the amount of cross talk. It is considered that a steep temperature distribution was obtained by use of the thermal change layer 5, and therefore, that the low cross talk was achieved.

As described above, the present invention enables recording on and reproduction from a track whose width is smaller than the light spot and the development of a high-density thermomagnetic recording medium.

Here, the substrate was a sapphire substrate whose thermal conductivity was as high as about 42 W/m/K and which had a high thermal resistance and was a flat and smooth monocrystalline substrate. However, glass disks which are widely used for other HDDs may be used as the substrate (aluminosilicate glass has a thermal conductivity of about 1.3 W/m/K).

Here, the recording/reproducing layer was formed of the film of TbFeCo alloy. In addition to that, it is preferable to use rare earth iron garnet ($Gd_3Fe_5O_{12}$) which is an n-type ferrimagnetic substance or a magnetic oxide such as lithium ferrite from the viewpoint of the reliability of the recording/reproducing layer (resistance to deterioration caused by oxidation during the heating process).

② Magneto-optical recording

In magneto-optical recording, the temperature distribution in the recording medium 1 determines the shape of a recorded bit. The temperature distribution is steepened by the use of the thermal change layer 5 of the present invention. Therefore, a smaller bit can be recorded (high-density recording). In addition, since bit edges are formed without disorder, the invention is suitable for reading bit edge information.

Since a magnetic-super-resolution (MSR) technique is used, the temperature distribution also affects reproduction a great deal. This is because the existence of light, which is a heat source, in the light spot reduces the reproduction margin of MSR utilizing difference in temperature within the light spot.

Here, brief explanation is given as to what effect the application of the thermal change layer 5 has on MSR reproduction, taking for example a center aperture detection (CAD) disk in which an aperture is generated in the center of the light spot and a magneto-optical signal can be detected only from the center of the light spot.

Figure 18:
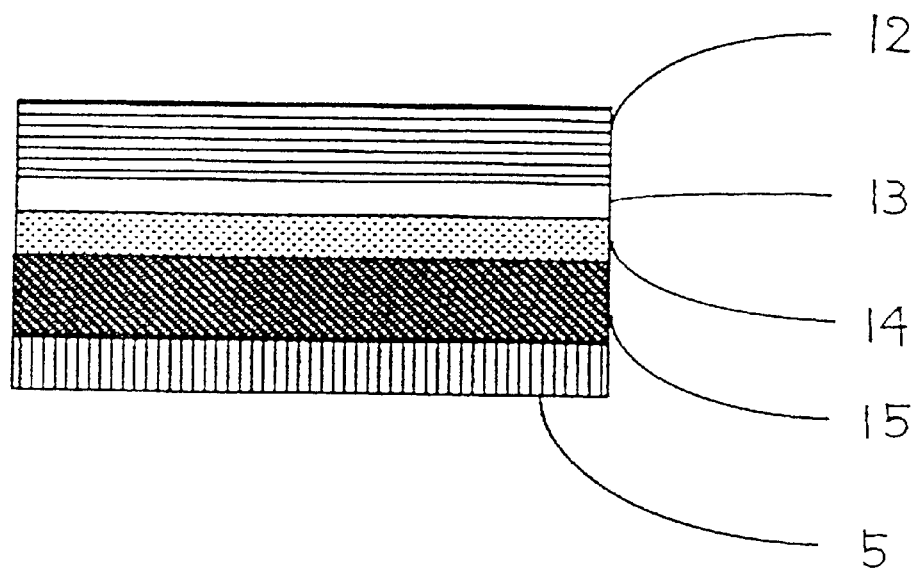
FIG. 18 is a schematic sectional view magneto-optical recording medium used in an embodiment in accordance with the present invention.

First, the construction of a recording media 1 is described. In addition to the construction of an ordinary magneto-optical medium including a reproducing layer 12 (GdFeCo film)/a reproduction assist layer 13/a non-magnetic layer 14/a recording layer 15 (TbFeCo film), the media was provided with a thermal change layer 5 ($La_{1-x}Sr_xMnO_3$ film) having a threshold temperature of about 150° C. FIG. 18 shows a schematic sectional view of this media. Magnetization was so set that transition temperature from in-planar magnetization to vertical magnetization in the reproducing layer 12 was 150° C. to 180° C.

The media was tested on recording and reproducing by use of an evaluating device for magneto-optical recording.

First, for comparison, a disk not provided with the thermal change layer 5 was evaluated. A bit error rate of $1\times10^{-6}$ was obtained at a minimum mark length of 0.2 μm under the condition of a track pitch of 0.6 μm.

Next, the evaluation of a disk provided with the thermal change layer 5 showed that a bit error rate of $1\times10^{-7}$ was obtained under the same conditions. Further, even when the minimum mark length was decreased to 0.18 μm, the bit error rate was $1\times10^{-6}$ or smaller. Thus an operational margin was increased.

In a magnetostatic coupling CAD-MSR, the resolution is in a trade-off relationship with a temperature range in which the recording layer 15 and the reproducing layer 12 are coupled to each other. More particularly, there is a problem in that as the coupling temperature range is wider, a larger operational margin in reproduction can be ensured but the resolution declines. Oppositely, as the coupling temperature range is narrower, the resolution improves, but the operational margin in reproduction decreases. However, it was found that the use of the thermal change layer 5 enables the temperature range for coupling the recording layer 15 and the reproducing layer 12 to be set wide while at the same time enabling a high resolution to be obtained because the temperature distribution is steepened.

As detailed above, in the magneto-optical recording, the temperature distribution can be smaller than the light spot at recording, and thereby small bits can be formed (high-density recording). In the MSR reproduction, it is possible to ensure a wide coupling temperature range for the recording layer 15 and the reproducing layer 12 as well as a high resolution since the temperature distribution can be formed to be smaller than the light spot.

According to the present invention, a reliable and steep temperature distribution can be obtained by utilizing the metal-to-insulator transition as the principle of the thermal conductivity change, and therefore, the temperature distribution in the light spot can be controlled to form a steep profile.

Since the thermal conductivity drops at the metal-to-insulator transition point or higher, the temperature distribution can be obtained according to a region in which the thermal conductivity drops.

Further, since the thermal conductivity drops at the threshold temperature of the thermal conductivity or higher, a rapid heating process and a rapid cooling process are enabled. Therefore, it is possible to improve the recording sensitivity and at the same to eliminate the problems of shift of bit edges and jitters due to heat accumulation.

Furthermore, by laminating thermal change layers different in threshold temperature, the temperature distribution in the light spot can be controlled even if the recording temperature and the reproducing temperature are different. Further, by disposing a thermal change layer having a higher threshold temperature of the laminated thermal change layers closer to the recording/reproducing layer, the temperature distribution can be controlled without expansion due to difference in temperature even if the recording temperature is different from the reproducing temperature.

Also in a magnetic recording and reproducing device, by setting the magnetic recording or reproducing temperature higher than the threshold temperature, it is possible to make recording on or reproducing from a track smaller than the light spot in width and thus realize high-density recording. Also, by setting the threshold temperature higher than the temperature at the circumference of the light spot, the temperature distribution can be controlled to be smaller than the light spot so that, within the light spot, the temperature is hardly raised around the circumference and is raised only around the center of the light spot.

What is claimed is:

1. A thermomagnetic recording medium comprising:
a single recording/reproducing layer and a single thermal change layer,
wherein a thermal conductivity of the thermal change layer is induced to change by a metal-to-insulator transition as a phase transition between solid-to-solid phases.

2. The thermomagnetic recording medium according to claim 1, wherein the thermal change layer is formed by a material selected from $(V_{1-x}Cr_x)_2O_3$ wherein X is about 0.51 and $La_{1-x}Sr_xMn_{1+y}O_3$ wherein X is 0.2 to 0.4 and y is 0.01 to 0.1 which can show a metal-to-insulator transition.

3. The thermomagnetic recording medium according to claim 1, wherein the thermal conductivity of the thermal change layer is changed by a threshold temperature and is greater on a lower temperature side of a transition temperature of the metal-to-insulator transition and is smaller on a higher temperature side thereof.

4. The thermomagnetic recording medium according to any one of claims 1, 2 and 3, wherein the thermal change layer comprises a laminate of thermal change layers having different threshold temperatures for the change of the thermal conductivity.

5. The thermomagnetic recording medium according to claim 4, wherein, of the laminated thermal change layers, a thermal change layer having a higher threshold temperature is disposed closer to the recording/reproducing layer.

6. A thermomagnetic recording and reproducing device comprising:
a thermomagnetic recording medium as set forth in any one of claims 1 to 3;
an optical pickup;
a magnetic head;
means for recording information by applying a light beam from the optical pickup and applying a magnetic field from the magnetic head to the thermomagnetic recording medium; and
means for reproducing the information by-applying the light beam and reading light or the magnetic field through a reproducing head,
wherein recording and reproduction are conducted by setting a threshold temperature for a change of the thermomagnetic conductivity of the thermal change layer higher than the temperature of the recording medium at the circumference of a light spot formed by the application of the light beam and setting a magnetic recording or reproducing temperature higher than the temperature at the circumference of the light spot and higher than the threshold temperature for the change of the thermomagnetic conductivity of the thermal change layer.

7. A thermomagnetic recording and reproducing device comprising:
a thermomagnetic recording medium as set forth in claim 4;
an optical pickup;
a magnetic head;
means for recording information by applying a light beam from the optical pickup and applying a magnetic field from the magnetic head to the thermomagnetic recording medium; and
means for reproducing the information by applying the light beam and reading light or the magnetic field through a reproducing head,
wherein recording and reproduction are conducted by setting a threshold temperature for a change of the thermomagnetic conductivity of the thermal change layer higher than the temperature of the recording medium at the circumference of a light spot formed by the application of the light beam and setting a magnetic recording or reproducing temperature higher than the temperature at the circumference of the light spot and higher than the threshold temperature for the change of the thermomagnetic conductivity of the thermal change layer.

8. A thermomagnetic recording and reproducing device comprising:
a thermomagnetic recording medium as set forth in claim 5;
an optical pickup;
a magnetic head;
means for recording information by applying a light beam from the optical pickup and applying a magnetic field from the magnetic head to the thermomagnetic recording medium; and
means for reproducing the information by applying the light beam and reading light or the magnetic field through a reproducing head,
wherein recording and reproduction are conducted by setting a threshold temperature for a change of the thermomagnetic conductivity of the thermal change layer higher than the temperature of the recording medium at the circumference of a light spot formed by the application of the light beam and setting a magnetic recording or reproducing temperature higher than the temperature at the circumference of the light spot and higher than the threshold temperature for the change of the thermomagnetic conductivity of the thermal change layer.

9. A thermomagnetic recording medium comprising a single recording/reproducing layer and a single thermal change layer,
wherein a thermal conductivity of the thermal change layer is induced to change by a metal-to-insulator transition as a phase transition between solid-to-solid phases, and
wherein the metal-to-insulator transition occurs at a temperature that differs from room temperature.

* * * * *